United States Patent
Seiden

(10) Patent No.: US 7,716,662 B2
(45) Date of Patent: May 11, 2010

(54) SYSTEM AND METHOD FOR GENERATING A SET TOP BOX CODE DOWNLOAD STEP SEQUENCE

(75) Inventor: Joshua A. Seiden, Highlands Ranch, CO (US)

(73) Assignee: Comcast Cable Holdings, LLC, Philadelphia, PA (US)

( * ) Notice: Subject to any disclaimer, the term of this patent is extended or adjusted under 35 U.S.C. 154(b) by 952 days.

(21) Appl. No.: 11/159,015

(22) Filed: Jun. 22, 2005

(65) Prior Publication Data

US 2006/0294512 A1     Dec. 28, 2006

(51) Int. Cl.
G06F 9/44 (2006.01)
H04N 7/16 (2006.01)

(52) U.S. Cl. .................. 717/173; 717/177; 717/178; 725/25

(58) Field of Classification Search ......... 717/168–178, 717/105, 126, 127; 725/25
See application file for complete search history.

(56) References Cited

U.S. PATENT DOCUMENTS

| | | | |
|---|---|---|---|
| 2002/0012347 A1* | 1/2002 | Fitzpatrick | 370/392 |
| 2002/0023271 A1* | 2/2002 | Augenbraun et al. | 725/109 |
| 2004/0181811 A1* | 9/2004 | Rakib | 725/122 |
| 2005/0160418 A1* | 7/2005 | Jeong et al. | 717/173 |
| 2005/0212504 A1* | 9/2005 | Revital et al. | 324/100 |
| 2006/0020938 A1* | 1/2006 | Elcock et al. | 717/178 |

OTHER PUBLICATIONS

Conditional access system interoperability through software downloading, Kamperman, F. van Rijnsoever, B. Philips Res. Lab., Eindhoven; 2001, IEEE, Vol. 47, Issue: 1, pp. 47-54.*
Set-top box software architectures for digital video broadcast andinteractive services, Jaeger, R.; 2001. IEEE, pp. 287-292.*

* cited by examiner

*Primary Examiner*—Wei Y Zhen
*Assistant Examiner*—Satish Rampuria
(74) *Attorney, Agent, or Firm*—Banner & Witcoff, Ltd.

(57) ABSTRACT

A method for generating a Set Top Box (STB) code download step sequence includes the steps of retrieving a code object from a Software Download Generator (SDG) memory in response to an instruction signal, generating at least one of a control message and a decoder conditional command using a SDG processor in response to the code object, accessing information in a channel map in the SDG memory, combining the at least one of a control message and a decoder conditional command with the code object to generate the STB code download step sequence for a target STB, transmitting the at least one STB code download step sequence from the SDG memory to a Digital Addressable Controller (DAC), re-transmitting the STB code download step sequence from the DAC to a Remote Addressable DANIS/DLS (RADD), and re-transmitting the STB code download step sequence from the RADD to the target STB.

20 Claims, 4 Drawing Sheets

SYSTEM AND METHOD FOR GENERATING A SET TOP BOX CODE DOWNLOAD STEP SEQUENCE

BACKGROUND OF THE INVENTION

1. Field of the Invention

This invention relates to a system and method for generating a Set Top Box Code Download Step Sequence.

2. Background Art

Media distribution systems (e.g., cable televison systems) typically have a headend where media streams originate. The headend is electrically coupled to a distribution network. Set top boxes (STBs) at user (subscriber) locations are electrically coupled to the network and to receivers (e.g., televisions). The media stream is typically compressed and encoded at the headend and decompressed and decoded at the STB for viewing and listening on the subscriber receiver. Subscribers are typically authorized to receive particular programming (e.g., through subscriptions as enabled by application programs, Pay Per View, etc.). Programming schedules are generally made available to the users via an Electronic Programming Guide (EPG). The STB control such as the authorized reception and EPGs are generally implemented by downloading STB Code Objects to respective subscriber STBs.

STB Code Objects (e.g., application programs, video/audio program listings, etc.) are typically updated by issuing a series of commands (i.e., a STB Code Download Step Sequence) from the headend of the cable, or other centralized media system that can have a national footprint. In addition to the desired Code Object update, the Code Download Step Sequence may require Decoder Conditionals and Control Messages to properly implement the update. In conventional approaches, a Digital Addressable Control (DAC) is used to update the STB Code Objects. A typical conventional DAC system can have 10 to 15 code objects. In conventional approaches using a network access server (NAS), well over 120 code objects are implemented in connection with a typical conventional media distribution system where additional control messages are used to control the download of any appropriate code objects, delete/purge old versions of code, authorize tiers, implement multicast addresses, and the like on specific sets of STBs in various regions of service.

In conventional approaches, the determination of the Decoder Conditionals and Control Messages is performed by an authorized and generally qualified headend technician using an interface to the DAC. The interface typically has a graphical user interface (GUI). The technician implementing a Code Download Step Sequence needs to have a working knowledge of all of the code objects to properly implement a Code Download Step Sequence.

Errors in a Code Download Step Sequence are especially problematic because the code errors are propagated to a large number of STBs within a short period of time. Further, in conventional approaches the DAC alone does not always abstract enough of the appropriate user protocol (e.g., DigCipher II (DCII), a Motorola proprietary video distribution system) and the headend technician is forced to use a working knowledge of the protocol to implement the complete proper code download. Accordingly, the determination of a complete Code Download Step Sequence is labor intensive and, because qualifications are not always met, prone to human error.

Thus, it would be desirable to have a system and method for determining a STB Code Download Step Sequence that overcomes or obviates deficiencies of conventional approaches.

SUMMARY OF THE INVENTION

Accordingly, the present invention generally provides a new and innovative system and method for generating a set top box (STB) Code Download Step Sequence including appropriate Decoder Conditionals and Control Messages. The system and method of the present invention generally provide for implementation of a robust Software Download Generator based (SDG) Code Download Step Sequence that is seamlessly presented to respective target STBs.

According to the present invention, a method for generating a Set Top Box (STB) code download step sequence is provided. The method comprises retrieving a code object from a Software Download Generator (SDG) memory in response to an instruction signal, generating at least one of a control message and a decoder conditional command using a SDG processor in response to the code object, accessing information in a channel map in the SDG memory, combining the at least one of a control message and a decoder conditional command with the code object to generate the STB code download step sequence for a target STB using the SDG processor, transmitting the at least one STB code download step sequence from the SDG memory to a Digital Addressable Controller (DAC), re-transmitting the STB code download step sequence from the DAC to a Remote Addressable DANIS/DLS (RADD), and re-transmitting the STB code download step sequence from the RADD to the target STB. The target STB is selected in response to the channel map information.

Also according to the present invention, a system for generating a Set Top Box (STB) code download step sequence is provided. The system comprises a Digital Addressable Controller (DAC), a Remote Addressable DANIS/DLS (RADD), and a Software Download Generator (SDG) having a processor and a memory. The SDG processor generates at least one of a control message and a decoder conditional command in response to an instruction signal, accesses information in a channel map, combines the at least one of a control message and a decoder conditional command with the code object to generate the STB code download step sequence for a target STB, and transmits the STB code download step sequence. The DAC receives the STB code download step sequence, and the RADD receives the STB code download step sequence and transmits the STB code download step sequence to the target STB. The target STB is selected in response to the channel map information.

Still further according to the present invention, a method for generating a Set Top Box (STB) code download step sequence is provided. The method comprises retrieving a code object from a Software Download Generator (SDG) memory in response to an instruction signal, generating at least one of a control message and a decoder conditional command using a SDG processor in response to the code object, accessing information in a channel map in the SDG memory, combining the at least one of a control message and a decoder conditional command with the code object to generate the STB code download step sequence for a target STB using the SDG processor, transmitting the at least one STB code download step sequence from the SDG memory to a Remote Addressable DANIS/DLS (RADD), and re-transmitting the STB code download step sequence from the RADD to the target STB. The target STB is selected in response to the channel map information.

These and other features and advantages of the present invention will be readily apparent upon consideration of the following detailed description of the invention in conjunction with the accompanying drawings.

DETAILED DESCRIPTION OF THE PREFERRED EMBODIMENT(S)

Figure 1:
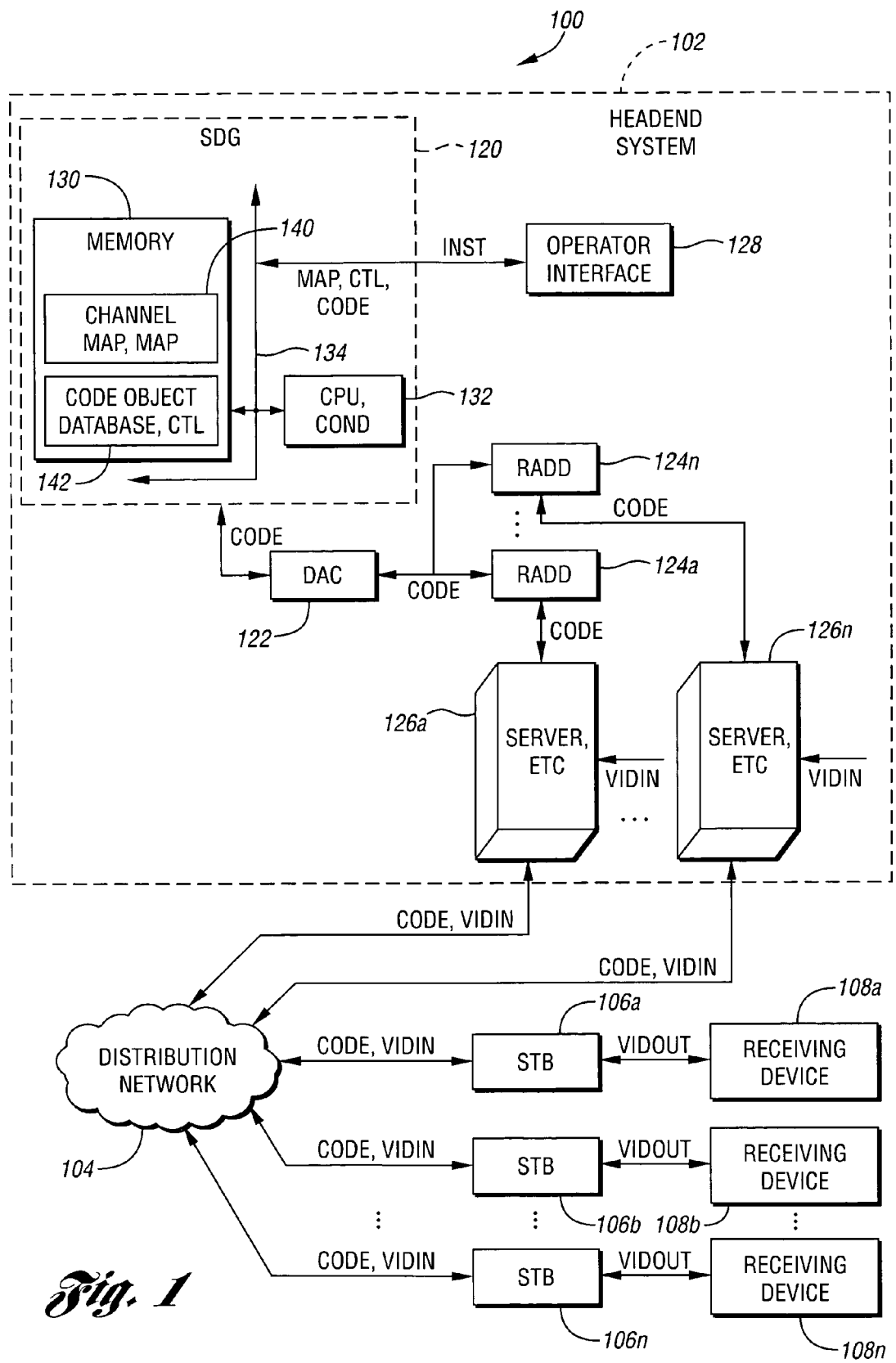
FIG. 1 is a diagram illustrating a media system implementing an example of the present invention.

With reference to the Figures, the preferred embodiments of the present invention will now be described in detail. In one example, the present invention may be implemented in connection with a cable television broadcast transmission and reception (i.e., media stream distribution) system. In another example, the present invention may be implemented in connection with a digital broadcast satellite (e.g., "DISH") television transmission and reception system (not shown). However, the present invention may be implemented in connection with any appropriate media stream transmission and reception (or distribution) system to meet the design criteria of a particular application.

In the description below, these terms may be defined as follows:

Access: The ability and structure (i.e., hardware, software, firmware, etc.) to communicate with or otherwise interact with a system in order to use system resources to either handle information or gain knowledge of the information the system contains. A specific type of interaction between a subject and an object that results in the flow of information from one to the other. Any ability to communicate with a system, including one-way communication in either direction. In actual practice, however, entities outside a security perimeter that can receive output from the system but cannot provide input or otherwise directly interact with the system, might be treated as not having "access" and, therefore, be exempt from security policy requirements, such as the need for a security clearance.

Access control: Protection of system resources against unauthorized access. A process by which use of system resources is regulated according to a security policy and is permitted by only authorized entities.

Access and Control (AC): Includes all functions required to protect the access to both digital and analog signals, to encrypt the digital signals, and to entitle them to subscribers individually or in groups. It includes tagging individual program services, virtual channel mapping, all other features which are not video and audio program or low speed data related, text services, and Program Guides. Also includes the procedures that control access to programming services, including key delivery, privilege (tier) management, and parameter authentication.

ASIC: Application Specific Integrated Circuit. A dedicated (i.e., designed for a particular application) microprocessor/micro-controller.

BSID: Billing System Identification. The numeric value assigned to a service or event. Also known as an Autho Code or Controller Event ID. The software application shared by the billing system and interface controller.

CAS: Conditional Access System (or Software)

Channel map: The association between tuned and displayed channels. A list of frequencies corresponding to channel designations (e.g., a mapping of transponders to cable channels). In particular, a channel map is generally implemented as a listing of all services that a provider (operator) offers to subscribers (users) in both analog and digital format in the respective channel lineups.

Control Messages: Instructions (or commands) issued in connection with a set top box (STB) Code Object update that implement a Code Object update at a receiving STB. Control Messages may instruct a receiving STB to perform tasks such as purging (i.e., deleting, eliminating, erasing, etc.) older version of code, copying the received code update into a specific section of STB memory, and the like.

Cryptographic key: Usually shortened to just "key". An input parameter (or value) that varies the transformation performed by a cryptographic algorithm. A sequence of symbols that controls the operations of encipherment and decipherment. When a key value is to be kept secret, the sequence of symbols (usually bits) that comprise the key should be random, or at least pseudo-random, because that makes the key more difficult for an adversary (e.g., hacker, thief, etc.) to determine.

DBS: Direct Broadcast Satellite (or System)

DAC: Digital Addressable Control system, manufactured by MOTOROLA (e.g., as DAC 6000). A DAC is a headend component of a cable (or other) centralized media (e.g., television) system that is responsible for high level management functions. Such functions may include configuring other headend components, scheduling services and programs, defining channel map assignments, generating reports, controlling encryption, configuring terminal communications, and issuing code download sequences.

DANIS: A MOTOROLA proprietary software module used in the configuration of headend components.

DCII: DigCipher II, a MOTOROLA proprietary video distribution system. DigiCipher II packet format follows the MPEG format of a 188 byte data structure consisting of a short header field followed by a longer data (payload) field.

DCT: (1) Digital Consumer Terminal. A MOTOROLA consumer device that receives compressed, encrypted digital signals and control data, then decompresses, decrypts, and converts incoming signals to analog output to the customer's television. The DCT also responds to commands, transmits data upstream, stores and reports purchase data, and enables the customer to select programs to view and define user features and functions. (2) Digital Communications Terminal or Direct-Conversion Transceiver. A device that receives analog signals, receives digital signals and converts them to analog, and transmits analog signals to the TV, e.g., the set top box. (3) Discrete Cosine Transform, a technique for representing waveform data as a weighted sum of cosines. DCT is commonly used for data compression, as in JPEG. This usage of DCT results in lossy compression. DCT itself does not lose data; rather, data compression technologies that rely on DCT approximate some of the coefficients to reduce the amount of data. Decompression techniques as in a set top box generally use an inverse DCT decoder.

Decoder Conditionals: Instructions (e.g., flags, commands, etc.) issued in connection with a Set Top Box (STB) Code Object update that qualify each receiving STB such that only STBs that satisfy the Decoder Conditionals may accept and install the code update. Decoder Conditionals may reference the type of STB, authorization tier, multicast address, and the like. However, any appropriate STB or media system parameter may provide the basis of a Decoder Conditional.

DLS: Down Load Server

DOCSIS: Data Over Cable Service Interface Specifications. DOCSIS is a standard interface for cable modems, the devices that handle incoming and outgoing data signals between a cable TV operator and a personal or business computer or television set. Although the term DOCSIS continues to be used, the standard is now being used to certify the products of cable modem makers. DOCSIS specifies modulation schemes and the protocol for exchanging bidirectional signals over cable. DOCSIS supports downstream-to-the-user data rates up to 27 Mbps (megabits per second).

DRM: Digital Rights Management. A system for protecting the rights of data circulated via the Internet or other digital media (e.g., satellite transmissions, cable distributions, and the like) by performing at least one of enabling secure distribution and disabling illegal distribution of the data. Typically, a DRM system protects intellectual property by either encrypting the data so that it can only be accessed by authorized users or marking the content with a digital watermark or similar method so that the content can not be freely distributed.

Encryption: A process intended to ensure the security of message or television transmissions. In the DigiCipher II (DCII) system, this is the digital process of encrypting the packet payload through the DigiCipher II encoded signal (DES). Note that encryption is not the same as scrambling.

Entitlement Control Message (Stream): ECM, Messages that generally define access requirements of a program, specify the tiers required for subscription, and the cost associated with impulse purchase of the program. The index may be delivered in the ECM as a reference to the content key. Encrypted program keys may be delivered in the ECM stream.

Entitlement Management Message (Stream): EMM, Messages that define access rights for each individual decoder. The EMM stream is processed with the access control device; however, the user processor buffers EMMs and feeds the EMMs to the access control device via an interface.

EPG: Electronic Program Guide, An on-screen navigational guide to facilitate selection of programming choices. EPG is a Non-PPV service that includes a data channel that uses dl_service_code_app for downloading applications.

Gateway: A node on a network that serves as an entrance to another network. In enterprises, the gateway is the computer that routes the traffic from a workstation to the outside network that is serving the Web pages. In homes, the gateway is the ISP that connects the user to the internet. In enterprises, the gateway node often acts as a proxy server and a firewall. The gateway is also associated with both a router, which use headers and forwarding tables to determine where packets are sent, and a switch, which provides the actual path for the packet in and out of the gateway.

GUI: Graphical User Interface. A program interface that takes advantage of the computer's graphics capabilities to make the program easier to use. Well-designed graphical user interfaces can free the user from learning complex command languages. On the other hand, many users find that they work more effectively with a command-driven interface, especially if they already know the command language. Graphical user interfaces, such as MICROSOFT WINDOWS and the one used by the APPLE MACINTOSH, feature the following basic components:

GUI: Graphical User Interface. A program interface that takes advantage of the computer's graphics capabilities to make the program easier to use. Well-designed graphical user interfaces can free the user from learning complex command languages. On the other hand, many users find that they work more effectively with a command-driven interface, especially if they already know the command language. Graphical user interfaces, such as Microsoft Windows and the one used by the Apple Macintosh, feature the following basic components: pointer: A symbol that appears on the display screen and that you move to select objects and commands. Usually, the pointer appears as a small angled arrow. Text-processing applications, however, use an I-beam pointer that is shaped like a capital I.

pointing device: A device, such as a mouse or trackball, that enables you to select objects on the display screen.

icons: Small pictures that represent commands, files, or windows. By moving the pointer to the icon and pressing a mouse button, you can execute a command or convert the icon into a window. You can also move the icons around the display screen as if they were real objects on your desk.

desktop: The area on the display screen where icons are grouped is often referred to as the desktop because the icons are intended to represent real objects on a real desktop.

windows: You can divide the screen into different areas. In each window, you can run a different program or display a different file. You can move windows around the display screen, and change their shape and size at will.

menus: Most graphical user interfaces let you execute commands by selecting a choice from a menu.

In addition to their visual components, graphical user interfaces also make it easier to move data from one application to another. A true GUI includes standard formats for representing text and graphics. Because the formats are well-defined, different programs that run under a common GUI can share data. This makes it possible, for example, to copy a graph created by a spreadsheet program into a document created by a word processor. Many DOS programs include some features of GUIs, such as menus, but are not graphics based. Such interfaces are sometimes called graphical character-based user interfaces to distinguish them from true GUIs.

Headend: The control center of a cable (or other) centralized media (e.g., television) system, where broadcast signals are received and distributed. The headend generally contains sending and satellite receivers, antennas which receive signals from local TV studios, and sometimes has TV studios inside the facility which produce shows and send the signals to other locations by satellite or antenna, preamplifiers, frequency converters, demodulators, encoders, compressors, automatic switching equipment and other related equipment that receives, amplifies, filters, encrypts, encodes, and converts incoming satellite and terrestrial streams for presentation to distribution channels. When a headend facility receives signals from a satellite, it retransmits the signals (analog and digital) at frequencies the cable plant can use.

Initialization vector: IV, An initialization vector in a block cipher is a block of bits that is combined with the first block of data in any of several feedback modes. The IV will make each cipher text unique, even when similar plain text is encrypted with the same key in chain block coding (CBC) mode.

IPPV: Impulse Pay Per View. A pay-per-view ordering mechanism whereby subscribers place orders directly into cable converters via universal remote control. Events are immediately authorized for viewing.

Interface: A boundary across which two independent systems meet and act on or communicate with each other, i.e., a shared boundary between elements in a system defined by common physical interconnection characteristics or signal characteristics. In computer technology, there are several types of interfaces.

user interface—the keyboard, mouse, menus of a computer system. The user interface allows the user to communicate with the operating system. Also see GUI.

software interface—the languages and codes that the applications use to communicate with each other and with the hardware.

hardware interface—the wires, plugs and sockets that hardware devices use to communicate with each other.

IP: Internet Protocol. IP specifies the format of packets, also called datagrams, and the addressing scheme. Most networks combine IP with a higher-level protocol called Transmission Control Protocol (TCP), which establishes a virtual connection between a destination and a source. IP by itself is something like the postal system. IP allows a user to address a package and drop the package in the system, but there is no direct link between the user (sender) and the recipient. TCP/IP, on the other hand, establishes a connection between two hosts so that the hosts can send messages back and forth for a period of time.

IRT: Integrated Receiver Transcoder. A device in a digital headend that receives digital signals (program and data), decrypts those signals, re-encrypts the signal, and passes them through to the cable plant for delivery to customers.

ISP: Internet Service Provider, a company that provides access to the Internet. For a monthly fee, the service provider gives a software package, username, password and access phone number. Equipped with a modem, one can then log on to the Internet and browse the World Wide Web and USENET, and send and receive e-mail. In addition to serving individuals, ISPs also serve large companies, providing a direct connection from the company's networks to the Internet. ISPs themselves are connected to one another through Network Access Points (NAPs). ISPs are also called IAPs (Internet Access Providers).

Kernel: The central module of an operating system. It is the part of the operating system that loads first, and it remains in main memory. Because it stays in memory, it is important for the kernel to be as small as possible while still providing all the essential services required by other parts of the operating system and applications. Typically, the kernel is responsible for memory management, process and task management, and disk management.

KLS: Kernel Lockdown Scripts

Media: Plural of medium. The form and technology used to communicate information. Multimedia presentations, for example, combine sound (e.g., audio), pictures, and videos, all of which are different types of media. Media streams generally include video, audio, video plus audio, and the like in any appropriate format or protocol such as Motion Picture Expert Group (MPEG), MPEG-2, MPEG-4, WINDOWS Media 9, REAL Media, etc.

MPEG: Moving/Motion Picture Experts Group, a working group of ISO. The term also refers to the family of digital video compression standards and file formats developed by the group. MPEG generally produces better-quality video than competing formats, such as Video for WINDOWS, INDEO and QUICKTIME. MPEG files can be decoded by special hardware or by software. MPEG achieves high compression rate by storing only the changes from one frame to another, instead of each entire frame. The video information is then encoded using a technique called DCT. MPEG uses a type of lossy compression, since some data is removed. But the diminishment of data is generally imperceptible to the human eye.

There are three major MPEG standards: MPEG-1, MPEG-2 and MPEG-4. The most common implementations of the MPEG-1 standard provide a video resolution of 352-by-240 at 30 frames per second (fps). This produces video quality slightly below the quality of conventional VCR videos.

MPEG-2 offers resolutions of 720×480 and 1280×720 at 60 fps, with full CD-quality audio. This is sufficient for all the major TV standards, including NTSC, and even HDTV. MPEG-2 is used by DVD-ROMs. MPEG-2 can compress a 2 hour video into a few gigabytes. While decompressing an MPEG-2 data stream requires only modest computing power, encoding video in MPEG-2 format requires significantly more processing power.

MPEG-4 is a graphics and video compression algorithm standard that is based on MPEG-1 and MPEG-2 and APPLE QUICKTIME technology. Wavelet-based MPEG-4 files are smaller than JPEG or QUICKTIME files, so they are designed to transmit video and images over a narrower bandwidth and can mix video with text, graphics and 2-D and 3-D animation layers. MPEG-4 was standardized in October 1998 in the ISO/IEC document 14496.

Middleware: Software that connects two otherwise separate applications. For example, there are a number of middleware products that link a database system to a Web server. The middleware allows users to request data from the database using forms displayed on a Web browser, and enables the Web server to return dynamic Web pages based on the user's requests and profile. The term middleware is used to describe separate products that serve as the glue between two applications. Middleware is, therefore, distinct from import and export features that may be built into one of the applications. Middleware is sometimes called plumbing because it connects two sides of an application and passes data between them.

MSO: Multiple System Operator

MVP: Multimedia Video Processor. Scrambles video and audio information on a user-selected modulating video analog addressable channel in a cable TV system. The processor scrambled signal contains information that allows only authorized converters to descramble and view the channel.

NAC: National Access Control. The national controller that controls the addressable set-top boxes, digital headend equipment, BSIDs, and Tag/Tiers.

NAS: National Access Services/Server. The national controller that controls the addressable set-top National Access boxes, digital headend equipment, BSIDS, and Tag/Tiers.

Network: A group of two or more computer systems linked together. There are many types of computer networks, including:

local-area networks (LANs): The computers are geographically close together (that is, in the same building).

wide-area networks (WANs): The computers are farther apart and are connected by telephone lines or radio waves.

campus-area networks (CANs): The computers are within a limited geographic area, such as a campus or military base.

metropolitan-area networks MANs): A data network designed for a town or city.

home-area networks (HANs): A network contained within a user's home that connects a person's digital devices.

In addition to these types, the following characteristics are also used to categorize different types of networks:

topology: The geometric arrangement of a computer system. Common topologies include a bus, star, and ring.

protocol: The protocol defines a common set of rules and signals that computers on the network use to communicate. One of the most popular protocols for LANs is called Ethernet. Another popular LAN protocol for PCs is the IBM token-ring network.

architecture: Networks can be broadly classified as using either a peer-to-peer or client/server architecture. Computers on a network are sometimes called nodes. Computers and devices that allocate resources for a network are called servers.

OBM: Out of Band Modulator. A device in a digital headend that receives control data from out-of-band the primary IRT and modulates it to a carrier frequency that modulator is used to deliver the control data to the digital set-top box. E.g., the MOTOROLA OM-1000.

OOB: Out Of Band. In particular, OOB messages are sent on radio frequency carriers that are separate from data carriers. OOB messages may include conditional access (CA), including entitlements, system information (SI), electronic program guide (EPG), emergency alert system (EAS), and the like. Generally an out-of-band signal is signaling that is separated from the channel carrying the information, for example, voice, data or video. The signaling includes dialing and other supervisory signals. Typically, the separation is accomplished through a filter. Also referred to as Out-Of-Band Data Stream.

Packet: A collection of contiguous bits of data. Each packet has a header that defines the attributes of the information in the packet. DigiCipher II packet format follows the MPEG format of a 188 byte data structure consisting of a short header field followed by a longer data (payload) field. Also called transport packet, as opposed to "PES packet."

Password: A secret series of characters that enables a user to access a file, computer, program, media stream, and the like. May be implemented in combination with or in connection with encryption/decryption.

PID: Program Identification/Identifier

PPV: Pay-Per-View. Usage-based fee structure in which the user is charged a price for individual programs requested.

Program: A time contiguous collection of motion image information, audio information, or a combination thereof that is generally transmitted (i.e., presented, broadcast, sent, delivered, etc.) as an entity.

Program Key: An encryption/decryption key that controls access, encryption/decryption, etc. of a particular program.

RADD: Remote Addressable DANIS/DLS. A RADD is one example (produced by MOTOROLA) of a headend component of a cable (or other) centralized media (e.g., television) system that supplies real-time repetitive messaging. Such real-time repetitive messages may include polling and code downloads to a group of set top boxes (STBs). A RADD may be connected between a DAC and a STB on a centralized media system network and may be used in connection with the DAC to schedule code downloads to STBs.

Smart card: A small electronic device about the size of a credit card that contains electronic memory, and possibly an embedded integrated circuit (IC). Smart cards containing an IC are sometimes called Integrated Circuit Cards (ICCs). Smart cards are used for a variety of purposes, including generating network IDs (similar to a token).

SSO: System Sign On

STB: Set-Top Box or Set Top Box. A STB is an electronic device that is connected to a communication channel, such as a phone, ISDN or cable television line, and produces output on a conventional television screen. Set-top boxes are commonly used to receive and decode digital television broadcasts and to interface with the Internet through the user's television instead of a PC. Set-top boxes fall into several categories, from the simplest that receive and unscramble incoming television signals to the more complex that will also function as multimedia desktop computers that can run a variety of advanced services such as videoconferencing, home networking, IP telephony, video-on-demand (VoD) and high-speed Internet TV services.

SNMP: Simple Network Management Protocol, a set of protocols for managing complex networks. SNMP works by sending messages, called protocol data units (PDUs), to different parts of a network. SNMP-compliant devices, called agents, store data about themselves in Management Information Bases (MIBs) and return this data to the SNMP requesters.

Sync (synchronize): (1) To occur or cause to occur at substantially the same time (2) To operate substantially in unison (3) To cause to agree substantially exactly in time or rate (4) To arrange so as to indicate substantially parallel occurrence.

Tag/Tier: The numeric value assigned to the service or event on the MVP or IRT that the set-top box looks for when the STB is tuned to a scrambled or encrypted channel. The tag/tier is required for the set-top box to descramble/decrypt the video and audio.

TCP: Transmission Control Protocol. TCP is one of the main protocols in TCP/IP networks. Whereas the IP protocol deals only with packets, TCP enables two hosts to establish a connection and exchange streams of data. TCP guarantees delivery of data and also guarantees that packets will be delivered in the same order in which the packets were sent.

Transponder: A combination receiver and transmitter on a satellite that relays signals transmitted to the satellite back to earth on a different frequency. For cable TV customers the number of transponders used relates to the number of channels that are available which is directly related to the number of programming options. For example, a 3-transponder (or 3-pack) system has the space to accommodate 36 digital channels.

UDP: User Datagram Protocol, a connectionless protocol that, like TCP, runs on top of IP networks. Unlike TCP/IP, UDP/IP provides very few error recovery services, offering instead a direct way to send and receive datagrams over an IP network. UDP is used primarily for broadcasting messages over a network.

Unit address: A unique number that identifies and distinguishes one decoder from another. One example of a unit address is a Media Access Control (MAC).

Unit key (or Private key): A key that is unique to a respective decoder. Messages intended for a particular decoder are encrypted using the respective unit key.

Unit keylist: A file that contains unit addresses and respective unit keys.

Uplink Control System (UCS): Software that is used to support the secure delivery of digitally compressed services. The UCS generally provides the capability to authorize and de-authorize individual decoders on an event-by-event basis.

URL: Uniform Resource Locator (World Wide Web address)

VOD: Video-On-Demand. VOD is an umbrella term for a wide set of technologies and companies whose common goal is to enable individuals to select videos from a central server for viewing on a television or computer screen. VOD can be used for entertainment (ordering movies transmitted digitally), education (viewing training videos), videoconferencing (enhancing presentations with video clips), and events. VOD provides programming that can be viewed immediately after selection.

Referring to FIG. 1, a diagram illustrating an example of a media stream processing and distribution system 100 that may be implemented in connection with the present invention is shown. The distribution system 100 generally comprises a headend (or operating center) 102, a network 104, at least one set top box (STB) 106 (generally a plurality of STBs 106a-106n), and at least one respective receiving device (i.e., receiver, transceiver, etc.) 108 (generally a plurality of devices 108a-108n). The distribution system 100 is generally implemented as a media service provider/subscriber system where an operator (i.e., provider, vendor, etc.) generally operates the headend 102 and the network 104, and also provides a subscriber (i.e., client, customer, consumer, service purchaser, user, etc.) with the STB 106.

The headend 102 is generally electrically coupled to the network 104, the network 104 is generally electrically coupled to the STB 106, and each STB 106 is generally electrically coupled to the respective device 108. The electrical coupling may be implemented as any appropriate hardwired (e.g., twisted pair, untwisted conductors, coaxial cable, fiber optic cable, hybrid fiber cable, etc.) or wireless (e.g., radio frequency, microwave, infrared, etc.) coupling and protocol (e.g., Home Plug, HomePNA, TCP/IP, UDP/IP, IEEE 802.11(a-b), BLUETOOTH, HomeRF, etc.) to meet the design criteria of a particular application. While the distribution system 100 is illustrated showing one STB 106 coupled to a respective one device 108, each STB 106 may be implemented having the capability of electrically coupling more than one device 108 (not shown).

The headend 102 may generate and present (i.e., transmit, provide, pass, broadcast, send, etc.) a signal (e.g., CODE), and a media stream (e.g., VIDIN) to respective portions of the distribution network 104. The signal CODE may be implemented as a STB Code Download Step Sequence. The signal CODE is generally related to applications such as an electronic program guide (EPG), interactive e-mail, implementation of new applications such as video on demand (VOD), pay per view (PPV), impulse PPV (IPPV), and the like. The signal CODE is generally presented as an out of band (OOB) signal and VIDIN is generally presented as an in band signal (i.e., media stream). The signal CODE is generally transmitted OOB relative to the media stream VIDIN.

The media stream VIDIN is generally implemented as an encrypted (and compressed) video and audio data stream. The media stream VIDIN may be implemented as a digital media transport stream (e.g., a media stream that includes video, audio, video plus audio, and the like in any appropriate format or protocol such as Motion Picture Expert Group (MPEG), MPEG-2, MPEG-4, WINDOWS Media 9, REAL Media, etc.).

The network 104 generally presents the signal CODE and the media stream VIDIN to appropriate STBs 106. The signal CODE is generally presented during a STB installation process and a STB update process. The media stream VIDIN generally comprises media appropriate to the respective subscriber (e.g., the media content such as regular broadcast media, Video On Demand (VOD), Pay Per View (PPV), Impulse Pay Per View (IPPV), gaming, and the like).

The STB 106 generally presents clear (i.e., decrypted and decompressed) video and audio data (e.g., a media transport stream VIDOUT) to the receiver 108 for reception, and viewing, listening and interaction by the respective subscriber. The STB 106 may be configured to decrypt (and decompress) the media stream VIDIN and present the clear media stream VIDOUT. However, the streams VIDIN and VIDOUT may be implemented having any appropriate format and protocol to meet the design criteria of a particular application. The STB 106 is generally updated in response to the signal CODE.

The headend 102 generally comprises a Software Download Generator (SDG) 120, a Digital Addressable Control system (DAC) 122, at least one Remote Addressable DANIS/DLS module (RADD) 124 (e.g., RADDs 124a-124n), at least one server 126 (e.g., servers 126a-126n), and an operator interface 128. The SDG 120 is generally electrically coupled to the DAC 122, the DAC 122 is generally electrically coupled to the at least one RADD 124 (e.g., to the RADDs 124a-124n), and each RADD 124 is generally electrically coupled to a respective portion (i.e., section, mesh, interface, interconnect, gateway, etc.) of the network 104 via a respective server 126 (i.e., the RADD 124a may be electrically coupled to the server 126a, and so on, and each server 126 may be electrically coupled to a respective portion of the network 104). The operator interface 128 is generally electrically coupled to the SDG 120.

The SDG 120 may have an input/output that may receive/present Code Object requests and operator command signals (or instruction signals) (e.g., a signal INST), and an output/input that may present/receive the signal CODE. The SDG 120 generally comprises a memory 130 and a processor (e.g., CPU, controller, microcontroller, microprocessor, application specific integrated circuit, etc.) 132. In one example, a bus 134 may be implemented to electrically inter-couple the SDG 120 (e.g., the memory 130 and the processor 132), the DAC 122, and the interface 128.

The DAC 122 may have an input/output that may be electrically coupled to the SDG 120 to receive/present the signal CODE, and an output/input that may be electrically coupled to the at least one RADD 124 to present/receive the signal CODE. In one example, the DAC 122 may be implemented as a MOTOROLA Digital Addressable Controller 6000. However, the DAC 122 is generally implemented as any appropriate controller to meet the design criteria of a particular application.

The RADD 124 may have an input/output that may be electrically coupled to the DAC 122 to receive/present the signal CODE, and an output/input that may be electrically coupled to the respective server 126 to present/receive the signal CODE. In one example, the RADD 124 may be implemented as a MOTOROLA Remote Addressable DANIS/DLS. However, the RADD 124 is generally implemented as any appropriate device (apparatus) to meet the design criteria of a particular application.

The server 126 may have an input/output that may be electrically coupled to the respective RADD 124 to receive/present the signal CODE, an input that may receive the media stream VIDIN, and an output/input that may be electrically coupled to the network 104 to present/receive the signal CODE and the media stream VIDIN. In one example, the server 126 may be implemented in connection with a MOTOROLA OM-1000 Out of Band Modulator (OBM) that may provide the OOB modulation of the signal CODE and a MOTOROLA NC-1500 Network Controller. However, the server 126 is generally implemented as any appropriate server having any appropriate combination of elements to meet the design criteria of a particular application.

The interface 128 may be implemented as any appropriate operator-to-computer interface device (e.g., keyboard, touchscreen, trackball, mouse, light pen, tape drive, floppy drive, CD Rom drive, DVD drive, USB port, card reader, display screen, monitor, etc.) and generally includes a graphical user interface (GUI). The interface 128 may be electrically coupled to the SDG 120 to transmit (i.e., present, send, etc.) and receive the signal INST between an operator (not shown, e.g., a headend technician, authorized operator, etc.) and the SDG 120. The operator may use the interface 128 to present the signal INST when a new installation or an update of an implementation, application, subscription, etc. to a STB (e.g., at least one STB 106, and generally a group of STBs 106) is desired.

The memory 130 generally comprises a channel map 140 and code object database 142. The channel map 140 may store channel map information (e.g., MAP) for each STB 106. The data MAP generally comprises parameters such as STB type, STB authorization, STB multicast address, and the like.

The code object database 142 may store the at least one Code Object (e.g., CTL), the operator command signals (e.g., the signal INST), and the at least one of a Control Message and a Decoder Conditional Command (e.g., a message/command COND), and the STB Code Download Step Sequence CODE. In one example, the at least one Code Object CTL may comprise a STB application program. In another example, the Code Object CTL may comprise a portion of a STB application program.

In one mode of operation (e.g., a phase), the CPU 132 may receive at least one of a Code Object request and an operator command (e.g., the signal INST) via the interface 128. The processor 132 may generate the at least one of a Control Message and a Decoder Conditional Command COND in response to the user command signals INST. The CPU 132 may access the STB channel map information MAP in the memory 142 to determine the appropriate STB parameters to include in the signal CODE The processor 132 may generate the STB Code Download Step Sequence CODE by associating (e.g., combining) the at least one Code Object OBJ with the at least one of a Control Message and a Decoder Conditional Command COND, and present the STB Code Download Step Sequence CODE to the DAC 122.

Each respective target STB 106 may be qualified by the STB Code Download Step Sequence Decoder Conditional COND to only accept and install the Code Object OBJ when the STB 106 satisfies the Decoder Conditional COND. In general, the Decoder Conditionals COND may reference the type, authorization tier, multicast address, and the like of the STB 106.

The Control Messages COND associated with the STB Code Download Step Sequence CODE may control the download (installation) of the Code Object to the respective (target) STB 106. In general, a receiving STB 106 may perform such tasks as purging (i.e., deleting) older version of code, copying the received Code Object into specific section of STB memory, syncing all appropriate STBs, and the like in response to the signal CODE.

The network 104 is generally implemented as a media stream distribution network (e.g., cable, satellite, and the like) that is configured to selectively distribute (i.e., transmit and receive) media streams (e.g., standard broadcast television and radio, digital television, HDTV, VOD, audio, MP3, text messaging, games, etc.) VIDIN to the STBs 106. Distribution is generally determined (selected) by user subscription, geographical region, time zone, purchase of Pay Per View (PPV) programming, and the like.

The STB 106 is generally located at the subscriber location (not shown, e.g., home, tavern, hotel room, business, etc.) and the receiving device 108 is generally provided by the client. The device 108 is generally implemented as a television, high definition television (HDTV), monitor, host viewing device, MP3 player, audio receiver, radio, personal computer, media player, digital video recorder, game playing device, etc. The device 108 may be implemented as a transceiver having interactive capability in connection with the STB 106, the headend 102 or both the STB 106 and the headend 102.

Figure 2:
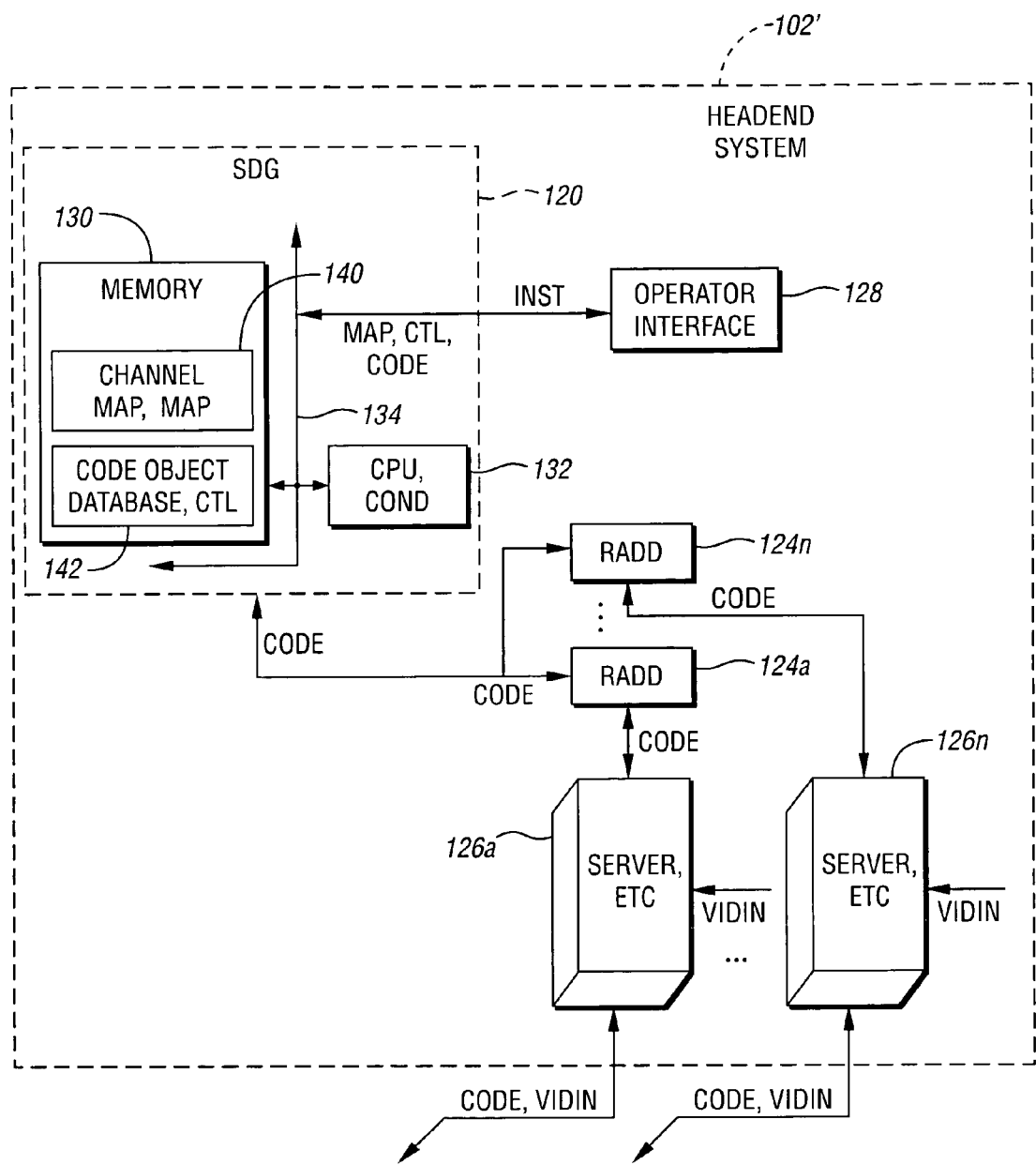
FIG. 2 is a diagram illustrating a headend of a media system implementing another example of the present invention.

Referring to FIG. 2, a diagram illustrating a headend system 102' that may be implemented in connection with the present invention is shown. The headend 102' may be another example of a media stream generation and distribution system headend. The headend system 102' may be implemented similarly to the system 102 with the exception that the DAC 122 may be omitted from the headend 102'. The SDG 120 may be directly electrically coupled to the at least one RADD 124. The STB Code Download Step Sequence CODE may transmitted (i.e., directly presented) to the at least one RADD 124 for re-transmission (presentation) to at least one target STB 106 via the network 104.

Figure 3A:
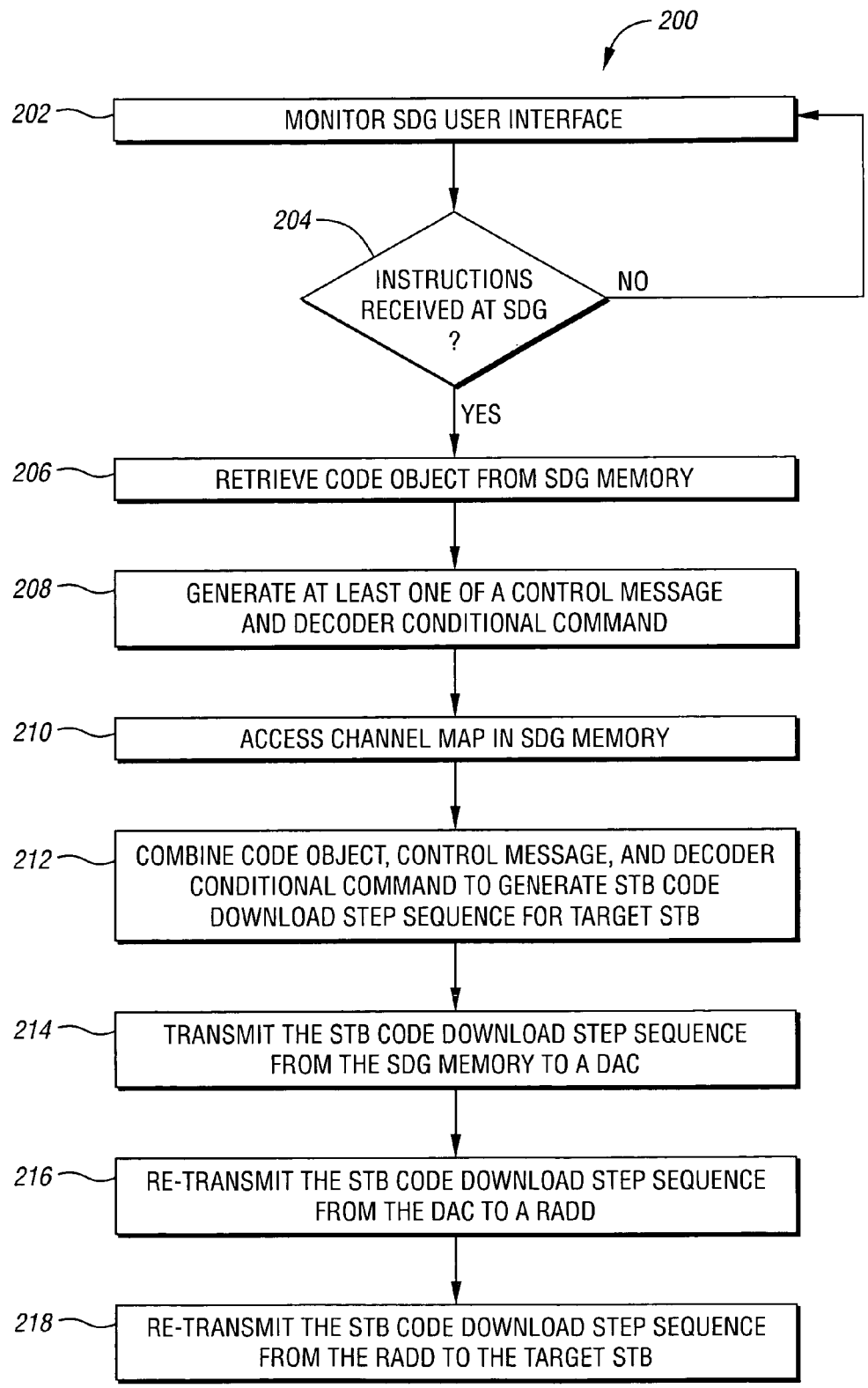
FIGS. 3(a-b) are flow diagrams illustrating methods of generating Set Top Box Code Download Step Sequences according to the present invention.

Referring to FIG. 3a, a diagram illustrating a method (i.e., process, procedure, operation, steps, blocks, routine, etc.) 200 of the present invention is shown. The method 200 may be one example of a method for generating a set top box (STB) Code Download Step Sequence. The method 200 is generally implemented in connection with a media stream processing and distribution system (e.g., the system 100 described in detail above in connection with FIG. 1). The method 100 generally comprises a plurality of blocks or steps (e.g., steps 202, 204, 206, 208, 210, 212, 214, 216, and 218) that may be performed serially. However, the steps of the method 200 may be performed in at least one non-serial (or non-sequential) order, and one or more steps may be omitted to meet the design criteria of a particular application.

A SDG interface (e.g., the interface 128) may be monitored (e.g., the SDG processor 132 may determine whether the interface 128 has presented the signal INST) (e.g., the block or step 202) to determine whether an operation instruction (e.g., the signal INST) has been received at the SDG (e.g., ths SDG 120) (e.g., the decision block or step 204).

When an operator instruction (e.g., the signal INST) is received at the SDG (e.g., the YES leg of the decision block or step 204), the Code Object may be retrieved from the SDG memory (e.g., the code object OBJ may be retrieved from the memory 130, more particularly in the Code Object database 142) (e.g., the block or step 206). At least one of a Control Message and a Decoder Conditional Command may be generated by the SDG processor (e.g., the block or step 208). A channel map (e.g., the memory 140) may be accessed to determine parameters (e.g., the information MAP) related to a target STB (e.g., the block or step 210).

The SDG processor (e.g., the CPU 132) may generate a STB Code Download Step Sequence (e.g., the signal CODE) by combining the Code Object with the at least one Control Message and Decoder Conditional Command (e.g., the block or step 212). The STB Code Download Step Sequence may be presented (e.g., transmitted, sent, etc.) by the SDG to a DAC (e.g., the DAC 122) (e.g., the block or step 214).

The DAC may re-transmit (i.e., present) the STB Code Download Step Sequence to a Remote Addressable DANIS/ DLS (RADD) (e.g., a RADD 124) (e.g., the block or step 216). The RADD may re-transmit (i.e., present) the STB Code Download Step Sequence to a respective target STB (e.g., at least one STB 106 that is intended to have an STB Code Download Step Sequence loaded from the headend via the network 104) via a server (e.g., the server 126) and a network (e.g., the network 104) (e.g., the block or step 218) for implementation in the target STB.

Returning to the decision block 204, when a Code Object is not received at the SDG (e.g., the NO leg of the decision block or step 204), the process 200 generally continues to monitor the SDG interface (i.e., the process 200 generally continues to perform the step 202).

Figure 3B:
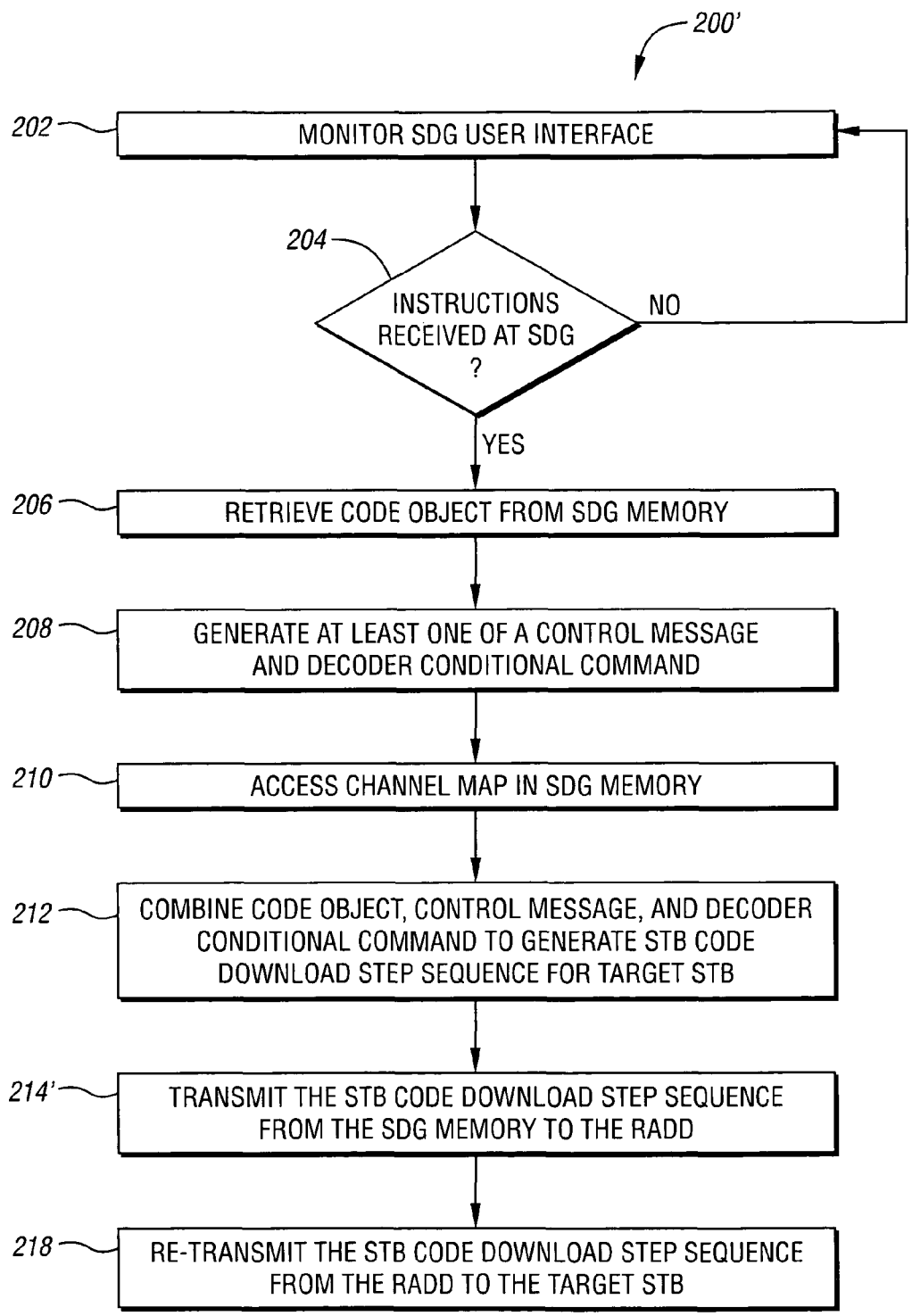

Referring to FIG. 3b, a diagram illustrating a method (i.e., procedure operation, steps, blocks, routine, etc.) 200' of the present invention is shown. The method 200' may be another example of a process for generating a STB Code Download Step Sequence. The method 200' is generally implemented in connection with a headend for media stream processing and distribution system (e.g., the headend 102' described above in detail in connection with FIG. 2). The method 200' generally comprises a plurality of blocks or steps that may be performed serially. However, the steps of the process 200' may be performed in at least one non-serial order, and steps may be omitted to meet the design criteria of a particular application.

A STB Code Download Step Sequence may be generated according to process detailed in the blocks or steps 202-212 as discussed above in connection with FIG. 3a. The STB Code Download Step Sequence may be transmitted directly from (i.e., presented by) the SDG memory (e.g., memory 130) and received by at least one RADD (e.g., the block or step 214'). The RADD may present the STB Code Download Step Sequence to a respective target STB 106 via a server and a network for implementation (e.g., the block or step 218).

As is readily apparent from the foregoing description, then, the present invention generally provides an improved system and an improved method for seamlessly and robustly updating a Code Object (e.g., generate and append the Decoder Conditionals and Control Messages to a desired. Code Object update) in a STB. In particular, the present invention generally reduces coding errors associated with the determination of the Decoder Conditionals and Control Messages while reducing labor expenditures.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for generating a Set Top Box (STB) code download step sequence, the method comprising:
    retrieving a code object from a Software Download Generator (SDG) memory;
    generating a control message in response to the code object;
    accessing information in a channel map defining a plurality of services that a provider offers to users;
    selecting at least one target STB based on one or more STB parameters stored in the channel map information;
    generating the STB code download step sequence for the at least one target STB by associating the control message with the code object; and
    transmitting the STB code download step sequence to the at least one target STB.

2. The method of claim 1 wherein the control message includes at least one command configured to purge code from the target STB.

3. The method of claim 1 wherein the STB code download step sequence transmission is compliant with a TCP/IP protocol.

4. The method of claim 1 wherein the transmitting step comprises:
    transmitting the STB code download step sequence to a Digital Addressable Controller (DAC);
    re-transmitting the STB code download step sequence from the DAC to a Remote Addressable DANIS/DLS (RADD); and
    re-transmitting the STB code download step sequence from the RADD to the target STB;
    wherein the RADD is electrically coupled to a server and the server transmits the STB code download step sequence and a media stream to the target STB.

5. The method of claim 4 wherein the STB code download step sequence is transmitted out of band relative to the media stream.

6. The method of claim 1 wherein the SDG causes the target STB to perform the STB code download step sequence when a predetermined parameter of the target STB satisfies a decoder conditional command.

7. The method of claim 6 wherein the predetermined parameter is at least one of STB type, STB authorization tier, and STB multicast address.

8. A system comprising:
    a Software Download Generator (SDG) having a processor and a memory, wherein the SDG processor is configured to retrieve a code object from the memory, to generate a control message, access information in a channel map defining a plurality of services that a provider offers to users, select at least one target Set Top Box (STB) based on one or more STB parameters stored in the channel map, generate a STB code download step sequence for the at least one target STB by associating the control message with the code object, and transmit the STB code download step sequence to the at least one target STB.

9. The system of the claim 8 wherein the control message includes at least one command configured to purge code from the target STB.

10. The system of claim 8 wherein the at least one STB code download step sequence transmission is compliant with a TCP/IP Protocol.

11. The system of claim 8 further comprising:
    a Digital Addressable Controller (DAC) that receives the STB code download step sequence; and
    a Remote Addressable DANIS/DLS (RADD) that receives the STB code download step sequence, and transmits the STB code download step sequence to the target STB;
    wherein the RADD is electrically coupled to a server and the server transmits the STB code download step sequence and a media stream to the target STB.

12. The system of claim 11 wherein the STB code download step sequence is transmitted out of band relative to the media stream.

13. The system of claim 8 wherein the SDG causes the target STB to perform the STB code download step sequence when a predetermined parameter of the target STB satisfies a decoder conditional command.

14. The system of claim 13 wherein the predetermined parameter is at least one of STB type, STB authorization tier, and STB multicast address.

15. A Software Download Generator (SDG) comprising a computer-readable medium having a computer-readable program code, the computer-readable program code adapted to be executed to implement a method for generating a Set Top Box (STB) code download step sequence, the method comprising:

- retrieving a code object from a SDG memory;
- generating a control message in response to the code object;
- accessing information in a channel map defining a plurality of services that a provider offers to users;
- selecting a target STB based on one or more STB parameters defined in the channel map information;
- generating the STB code download step sequence for the target STB by associating the control message with the code object; and
- transmitting the STB code download step sequence to the target STB.

16. The method of claim 15 wherein the control message includes at least one command configured to purge code from the target STB.

17. The method of claim 15 wherein the at least one STB code download step sequence transmission is compliant with a TCP/IP protocol.

18. The method of claim 15 wherein the transmitting step comprises:

- transmitting the STB code download step sequence from the SDG memory to a Remote Addressable DANIS/DLS (RADD); and
- re-transmitting the STB code download step sequence from the RADD to the target STB;
- wherein the RADD is electrically coupled to a server and the server transmits the STB code download step sequence and a media stream to the target STB.

19. The method of claim 18 wherein the STB code download step sequence is transmitted out of band relative to the media stream.

20. The method of claim 15 wherein SDG caused the target STB to perform the STB code download step sequence when a predetermined parameter of the target STB satisfies a decoder conditional command.

* * * * *

UNITED STATES PATENT AND TRADEMARK OFFICE
CERTIFICATE OF CORRECTION

PATENT NO. : 7,716,662 B2
APPLICATION NO. : 11/159015
DATED : May 11, 2010
INVENTOR(S) : Joshua A. Seiden It is certified that error appears in the above-identified patent and that said Letters Patent is hereby corrected as shown below:

In Detailed Description of the Preferred Embodiment(s), Column 5, Line 65 - Column 6, Line 7, the following is deleted: "GUI: Graphical user Interface. A program interface that takes advantage of the computer's graphics capabilities to make the program easier to use. Well-designed graphical user interfaces can free the user from learning complex command languages. On the other hand, many users find that they work more effectively with a command-driven interface, especially if they already know the command language. Graphical user interfaces, such as Microsoft Windows and the one used by Apple Macintosh, feature the following basic components:"

Signed and Sealed this

Ninth Day of November, 2010

David J. Kappos
*Director of the United States Patent and Trademark Office*